United States Patent
Indani et al.

(10) Patent No.: US 11,960,386 B2
(45) Date of Patent: Apr. 16, 2024

(54) AUTOMATED CONTINUOUS VALIDATION FOR REGULATORY COMPLIANCE OF A COMPUTER SYSTEM (CS) COMPRISING A DYNAMIC COMPONENT

(71) Applicant: Tata Consultancy Services Limited, Mumbai (IN)

(72) Inventors: Ashish Omprakash Indani, Mumbai (IN); Divya Vasudevan, Pune (IN); Devraj Goulikar, Mumbai (IN); Prita Venkateswaran, Mumbai (IN); Ashutosh Pachisia, Mumbai (IN); Prashant Chaturvedi, Hyderabad (IN); Rohit Kadam, Pune (IN); Vimal Chaubey, Mumbai (IN)

(73) Assignee: Tata Consultancy Services Limited, Mumbai (IN)

(*) Notice: Subject to any disclaimer, the term of this patent is extended or adjusted under 35 U.S.C. 154(b) by 85 days.

(21) Appl. No.: 17/897,362

(22) Filed: Aug. 29, 2022

(65) Prior Publication Data

US 2023/0076795 A1 Mar. 9, 2023

(30) Foreign Application Priority Data

Aug. 30, 2021 (IN) .............................. 202121039227

(51) Int. Cl.
  *G06F 11/36* (2006.01)
  *G06F 9/44* (2018.01)
  *G06F 16/28* (2019.01)

(52) U.S. Cl.
  CPC ...... *G06F 11/3684* (2013.01); *G06F 11/3688* (2013.01); *G06F 11/3692* (2013.01); *G06F 11/3672* (2013.01)

(58) Field of Classification Search
  CPC ............. G06F 11/3684; G06F 11/3688; G06F 11/3692; G06F 11/3672
  See application file for complete search history.

(56) References Cited

U.S. PATENT DOCUMENTS

| | | | |
|---|---|---|---|
| 9,280,450 B2 | 3/2016 | Wong et al. | |
| 2008/0215387 A1* | 9/2008 | Muthusamy | G06Q 10/06316 705/7.26 |

(Continued)

OTHER PUBLICATIONS

Carmen Medina, Compliance Handbook for Pharmaceuticals, Medical Devices and Biologics, 2004, [Retrieved on Jan. 3, 2024]. Retrieved from the internet: <URL: http://ndl.ethernet.edu.et/bitstream/123456789/502/1/34.pdf#page=243> 659 Pages (1-645) ( Year: 2004).*

(Continued)

*Primary Examiner* — Anibal Rivera
(74) *Attorney, Agent, or Firm* — Finnegan, Henderson, Farabow, Garrett & Dunner, LLP

(57) ABSTRACT

A method and system for automated continuous validation for regulatory compliance of CS with dynamic component. On identification of learning in the CS, a User Acceptance Testing (UAT) is performed using automated test cases of varying types in accordance with what-if scenarios and synthetic data generated using a unique approach. Thereafter, a base validation testing of the CS is performed with clean data (positive scenarios of outcome of the CS) and dirty data (negative scenarios) by conducting repeatability, stability (consistency) and reliability checks. The base validation testing is then followed by learning saturation testing on only if the dynamic component is validated, is rolled out in production environment else is rolled back to the earlier version.

12 Claims, 13 Drawing Sheets

(56) References Cited

U.S. PATENT DOCUMENTS

| | | | | |
|---|---|---|---|---|
| 2015/0346705 A1* | 12/2015 | Chew | ............... | G06Q 10/06395 |
| | | | | 700/86 |
| 2018/0189797 A1* | 7/2018 | Ravi | .................... | G06Q 30/018 |
| 2021/0201190 A1 | 7/2021 | Edgar | | |

OTHER PUBLICATIONS

Patil Yogesh, Computer System Validation: A Review, 2015, [Retrieved on Jan. 3, 2024]. Retrieved from the internet: <URL: https://wjpr.s3.ap-south-1.amazonaws.com/article_issue/1441002998.pdf> 11 Pages (444-454) (Year: 2015).*

HP Invent, "Automated testing in FDA-regulated environments with HP and Genilogix," White paper, genilogix (2007).

Nair et al., "AI Regulation is Coming to Life Sciences: Three Steps to Take Now," Perspectives, (2020).

* cited by examiner

AUTOMATED CONTINUOUS VALIDATION FOR REGULATORY COMPLIANCE OF A COMPUTER SYSTEM (CS) COMPRISING A DYNAMIC COMPONENT

PRIORITY CLAIM

This U.S. patent application claims priority under 35 U.S.C. § 119 to: Indian Patent Application No. 202121039227, filed on 30 Aug. 2021. The entire contents of the aforementioned application are incorporated herein by reference.

TECHNICAL FIELD

The embodiments herein generally relate to automated validation of systems and, more particularly, to a method and system for automated continuous validation for regulatory compliance of a Computer System (CS) comprising a dynamic component.

BACKGROUND

Research and developments in field of Artificial Intelligence (AI), quantum computing and the like has introduced systems that have dynamic components, which change over time. This change may be a change in version of a Machine learning (ML) model in the AI system, ontology updates acquired by the AI system, or presence of dynamic algorithms or random classifications, as in quantum computing systems. When such systems are used in applications, where the systems need to be compliant to applicable regulations, any change or learning or automated update needs to be tested for being compliant with the regulations. Furthermore, when it comes to regulations such as Software Development Life Cycle (SDLC) and 21 Code of Federal Regulation (CFR) part 11 requirements and the like, the compliance requirements are further stringent.

Current technology is limited to performing validation of static systems for regulatory compliance check for SDLC and 21 Code of Federal Regulation (CFR) part 11 requirements and the like. Validation includes system testing, unit testing, system integration testing, validation testing for acceptance of outcomes etc. However, test data for this is selected manually and the data selection is followed by manual batch run. However, hardly any attempts have been made for solutions in automated validation of dynamic component based system, for example AI systems or quantum computing systems. Conventionally, the testing is based on selection of clean data and dirty data manually, with manual statistics and determination of acceptance. As understood, using manual methods have several problems beyond operational delays and bias.

AI/ML based systems or quantum computing based systems being dynamic systems, managing processes that are applicable to static systems, such as release management, change management etc., are very difficult to manage by manual testing and validation. The changes, like product design/roadmap driven changes, ontology driven changes, change-request driven changes, and incident driven changes are the changes that can be controlled, planned, and managed to maintain their compliance with the regulations and procedures focused on static system. However, regulating compliance with respect to learning driven changes that happens in AI/ML based systems is a challenge as the changes that are happening in the system cannot be versioned due to the incapability of the system to make note of the changes occurring in the knowledge representation. Further, in the AI/ML based systems, every transaction that is happening has the capability to impact the knowledge representation which further requires compliance monitoring and validation of the model versions along with their sub-processes. The problem associated with the validation of the model versions is that they are very time consuming and almost impossible to manage by human-driven testing as sample selection for training needs to be done manually along with statistics and determination of acceptance, which further creates problems like operational delays, bias and more.

SUMMARY

Embodiments of the present disclosure present technological improvements as solutions to one or more of the above-mentioned technical problems recognized by the inventors in conventional systems.

For example, in one embodiment, a method for automated continuous validation for regulatory compliance of a Computer System (CS) comprising a dynamic component is provided.

The method includes detecting a learning of the dynamic component by analyzing system logs of the CS and generating a replica of the dynamic component of the CS deployed in production phase if learning is detected.

Thereafter, the method comprises performing a User Acceptance Testing (UAT) in real time on the replica of the dynamic component for the detected learning by: a) Creating a functional map by acquiring i) a manually approved regulatory document created for the dynamic component as per regulatory mandates or requirements from a static system to cater to an associated function, and ii) a user specification requirement document comprising user specification, functional specification, and model characteristics specification. b) Generating, based on the manually approved regulatory document, a plurality of test entities comprising a plurality of test cases of varying types in accordance with a plurality of what-if scenarios, a plurality of test scripts for the plurality of test cases, and a synthetic test data. c) Generating synthetic test data for the plurality of test cases by: selecting a data sample from a plurality of zones defined by a pre-set variation in a plurality of values of a standard deviation (s) from a starting mean acceptance value ($\mu_x$, $\mu_y$) in a data sample space by recreating samples from the plurality of zones in accordance with each of the plurality of what-if scenarios of corresponding target outcome of the CS with the dynamic component to cover the plurality of test cases of the varying types, wherein the selected data sample is then mimicked in all quadrants formed around the starting mean acceptance value ($\mu_x$, $\mu_y$) to generate a complete polygram; selecting a base synthetic test data from the data sample by taking data that falls under curve of the complete polygram; and generating the synthetic test data by performing sub-sampling of the base synthetic test data by reducing plurality of parameters in the base synthetic test data using statistical models. d) Setting an acceptance criterion for each of the plurality of test cases using three-sigma statistics defined by the standard deviation values (s, 2s, 3s) and a user specification requirement captured in the user specification requirement document. e) Obtaining a standard Receiver Operator Characteristic (ROC) curve, from a ROC curve constructed for each of the plurality of test cases for the synthetic test data as input and corresponding outcome of the CS based on the set acceptance criterion for each of the plurality of test cases, wherein the ROC curve is constructed using the starting mean acceptance value, ending acceptance value derived from confidence interval defined for the standard deviation and a central intercept value. f) Checking whether the CS with the dynamic component meets a regulatory compliance of interest by executing the plurality of test scripts on the synthetic test data by: disabling learning of the dynamic component so that the synthetic test data does not affect model characteristics of the dynamic component; determining whether a true outcome of the CS, with learning of the dynamic component disabled, for corresponding input from the synthetic dataset, meets requirement of any variant of the standard ROC curve by checking a layout of data points on the standard ROC curve; and then determining the CS as a complaint CS if all the data points of the true outcome fall under the standard ROC curve, otherwise declaring the CS as a non-complaint CS, wherein the determined learning of the dynamic component declared as non-compliant is rejected, and the dynamic component is rolled back to a previous version.

The method further includes performing a base validation testing of the compliant CS to ensure repeatability, statistical stability, and consistency of the replica of the dynamic component before the learning is permitted to roll out in the production phase.

In another aspect, a system for automated continuous validation for regulatory compliance of a Computer System (CS) comprising a dynamic component is provided. The system comprises a memory storing instructions; one or more Input/Output (I/O) interfaces; and one or more hardware processors coupled to the memory via the one or more I/O interfaces, wherein the one or more hardware processors are configured by the instructions to detect a learning of the dynamic component by analyzing system logs of the CS and generating a replica of the dynamic component of the CS deployed in production phase if learning is detected.

Thereafter, the one or more hardware processors are configured to perform a User Acceptance Testing (UAT) in real time on the replica of the dynamic component for the detected learning by: a) Creating a functional map by acquiring i) a manually approved regulatory document created for the dynamic component as per regulatory mandates or requirements from a static system to cater to an associated function, and ii) a user specification requirement document comprising user specification, functional specification, and model characteristics specification. b) Generating, based on the manually approved regulatory document, a plurality of test entities comprising a plurality of test cases of varying types in accordance with a plurality of what-if scenarios, a plurality of test scripts for the plurality of test cases, and a synthetic test data. c) Generating synthetic test data for the plurality of test cases by: selecting a data sample from a plurality of zones defined by a pre-set variation in a plurality of values of a standard deviation (s) from a starting mean acceptance value ($\mu_x$, $\mu_y$) in a data sample space by recreating samples from the plurality of zones in accordance with each of the plurality of what-if scenarios of corresponding target outcome of the CS with the dynamic component to cover the plurality of test cases of the varying types, wherein the selected data sample is then mimicked in all quadrants formed around the starting mean acceptance value ($\mu_x$, $\mu_y$) to generate a complete polygram; selecting a base synthetic test data from the data sample by taking data that falls under curve of the complete polygram; and generating the synthetic test data by performing sub-sampling of the base synthetic test data by reducing plurality of parameters in the base synthetic test data using statistical models. d) Setting an acceptance criterion for each of the plurality of test cases using three-sigma statistics defined by the standard deviation values (s, 2s, 3s) and a user specification requirement captured in the user specification requirement document. e) Obtaining a standard Receiver Operator Characteristic (ROC) curve, from a ROC curve constructed for each of the plurality of test cases for the synthetic test data as input and corresponding outcome of the CS based on the set acceptance criterion for each of the plurality of test cases, wherein the ROC curve is constructed using the starting mean acceptance value, ending acceptance value derived from confidence interval defined for the standard deviation and a central intercept value. f) Checking whether the CS with the dynamic component meets a regulatory compliance of interest by executing the plurality of test scripts on the synthetic test data by: disabling learning of the dynamic component so that the synthetic test data does not affect model characteristics of the dynamic component; determining whether a true outcome of the CS, with learning of the dynamic component disabled, for corresponding input from the synthetic dataset, meets requirement of any variant of the standard ROC curve by checking a layout of data points on the standard ROC curve; and then determining the CS as a complaint CS if all the data points of the true outcome fall under the standard ROC curve, otherwise declaring the CS as a non-complaint CS, wherein the determined learning of the dynamic component declared as non-compliant is rejected, and the dynamic component is rolled back to a previous version.

Thereafter, the one or more hardware processors are configured to perform a base validation testing of the compliant CS to ensure repeatability, statistical stability, and consistency of the replica of the dynamic component before the learning is permitted to roll out in the production phase.

In yet another aspect, there are provided one or more non-transitory machine-readable information storage mediums comprising one or more instructions, which when executed by one or more hardware processors causes a method for automated continuous validation for regulatory compliance of a Computer System (CS) comprising a dynamic component.

The method includes detecting a learning of the dynamic component by analyzing system logs of the CS and generating a replica of the dynamic component of the CS deployed in production phase if learning is detected.

Thereafter, the method comprises performing a User Acceptance Testing (UAT) in real time on the replica of the dynamic component for the detected learning by: a) Creating a functional map by acquiring i) a manually approved regulatory document created for the dynamic component as per regulatory mandates or requirements from a static system to cater to an associated function, and ii) a user specification requirement document comprising user specification, functional specification, and model characteristics specification. b) Generating, based on the manually approved regulatory document, a plurality of test entities comprising a plurality of test cases of varying types in accordance with a plurality of what-if scenarios, a plurality of test scripts for the plurality of test cases, and a synthetic test data. c) Generating synthetic test data for the plurality of test cases by: selecting a data sample from a plurality of zones defined by a pre-set variation in a plurality of values of a standard deviation (s) from a starting mean acceptance value ($\mu_x$, $\mu_y$) in a data sample space by recreating samples from the plurality of zones in accordance with each of the plurality of what-if scenarios of corresponding target outcome of the CS with the dynamic component to cover the plurality of test cases of the varying types, wherein the selected data sample is then mimicked in all quadrants formed around the starting mean acceptance value ($\mu_x$, $\mu_y$) to generate a complete polygram; selecting a base synthetic test data from the data sample by taking data that falls under curve of the complete polygram; and generating the synthetic test data by performing sub-sampling of the base synthetic test data by reducing plurality of parameters in the base synthetic test data using statistical models. d) Setting an acceptance criterion for each of the plurality of test cases using three-sigma statistics defined by the standard deviation values (s, 2s, 3s) and a user specification requirement captured in the user specification requirement document. e) Obtaining a standard Receiver Operator Characteristic (ROC) curve, from a ROC curve constructed for each of the plurality of test cases for the synthetic test data as input and corresponding outcome of the CS based on the set acceptance criterion for each of the plurality of test cases, wherein the ROC curve is constructed using the starting mean acceptance value, ending acceptance value derived from confidence interval defined for the standard deviation and a central intercept value. f) Checking whether the CS with the dynamic component meets a regulatory compliance of interest by executing the plurality of test scripts on the synthetic test data by: disabling learning of the dynamic component so that the synthetic test data does not affect model characteristics of the dynamic component; determining whether a true outcome of the CS, with learning of the dynamic component disabled, for corresponding input from the synthetic dataset, meets requirement of any variant of the standard ROC curve by checking a layout of data points on the standard ROC curve; and then determining the CS as a complaint CS if all the data points of the true outcome fall under the standard ROC curve, otherwise declaring the CS as a non-complaint CS, wherein the determined learning of the dynamic component declared as non-compliant is rejected, and the dynamic component is rolled back to a previous version.

The method further includes performing a base validation testing of the compliant CS to ensure repeatability, statistical stability, and consistency of the replica of the dynamic component before the learning is permitted to roll out in the production phase.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1A:
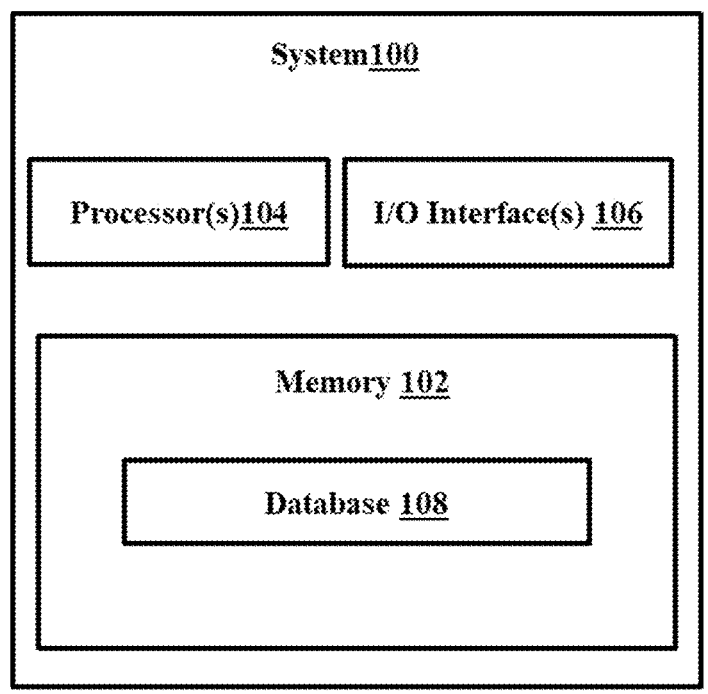
FIG. 1A is a functional block diagram of a system, for automated continuous validation for regulatory compliance of a Computer System (CS) comprising a dynamic component, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Software Development Life Cycle (SDLC) and 21 CFR part 11 requirements are control based validation requirements, which are currently focused only on static systems. All the Machine Learning and AI based Systems are dynamic. Therefore, in the long term, managing these systems with processes applicable to static system like release management, change management etc. is impossible to manage by human-driven testing and validation. The changes in the AI ML based Life Sciences systems include 5 major types.

1. Product Design/Roadmap Driven Changes
2. Ontology Driven Changes
3. Change-Request (CR) Driven Changes a. Deliverable (changes in input or output formats)
b. Product Feature
c. System Components
d. Process/Procedure/Regulation Amendments
4. Incident Driven Changes
5. Learning Driven Changes
   a. Supervised Learning
   b. Deep and Reinforced Learning Of these, 1 to 5a are the changes in extreme controls and can be planned and managed (in some way or other) to maintain their compliance with the regulations and procedures focused on static systems. However, the changes under point 5.b. have several limitations in compliance as stated below:

Every single transaction has impact on the knowledge representation within the model All changes of the AI-ML model cannot be versioned as the system does not take cognizance of the changes in knowledge representation Controlling Model versions and thereby its validation including sub-processes manually is an impossible proposition The need of industry is to develop a method that can automate the validation process, which requires no human intervention in the testing process. Very few attempts have been made in literature to address, validation testing of dynamic components. An existing patent literature 'Machine learning model development and optimization process that ensures performance validation and data sufficiency for regulatory approval' refers to a machine learning model that measures uncertainty and performance of a diagnostic model as per the regulatory requirements for "work as intended" and hence, majorly depends upon accuracy as the parameter of testing, wherein the performance testing proposed is a one sided testing. The existing method relies on an equation specifically used in context with performance of the diagnostic model. However, the limitation of this existing approach is that being specific to performance testing, existing method is not applicable for any other testing such as validation testing with clean data and dirty data and does not provide a generalized approach to system validation. Further, the existing approaches focus mainly on checking data sufficiency and performance validation, thus are not oriented towards SOLO tasks, neither do they mention capabilities related to perform a systematic validation testing of the system under test nor do they provide capability to validate the learning of the learning model. Furthermore, the existing method proposes solutions specific to only ML models and has limitations to evaluate other types of dynamic components, such as dynamic components of quantum computing systems, and hence is not a generalized solution.

Embodiments of the present disclosure provide a method and system for automated continuous validation for regulatory compliance of a Computer System (CS) comprising a dynamic component. The dynamic component herein refers to one or more subcomponents that undergo changes or learn when in production, such as learnings of Machine Learning (ML) models or automated updates of ontologies and dictionaries in Artificial Intelligence (AI) systems, one or more subcomponents in quantum computing systems that undergo change or the like. Thus, unlike the existing method mentioned above, the method disclosed herein provides generalized validation testing for any type of dynamic component, not restricted to only ML models, on detection of every small or big change (learning) that the CS undergoes in the production environment, wherein the validation testing is carried out without interrupting the production stage.

Thus, method and system disclosed herein provides a generalized, real time, in production continuous validation testing platform for CS to check regulatory compliance of the change or learning of CS.

Referring now to the drawings, and more particularly to FIGS. 1A through 10, where similar reference characters denote corresponding features consistently throughout the figures, there are shown preferred embodiments and these embodiments are described in the context of the following exemplary system and/or method.

FIG. 1A is a functional block diagram of a system, for automated continuous validation for regulatory compliance of a Computer System (CS) comprising a dynamic component, in accordance with some embodiments of the present disclosure. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices such as the CS.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a database 108 that stores replicas of the dynamic component, generated synthetic data, generated test cases, test scripts and the like. Further, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of the system 100 are explained in conjunction FIGS. 1B through 10.

Figure 1B:
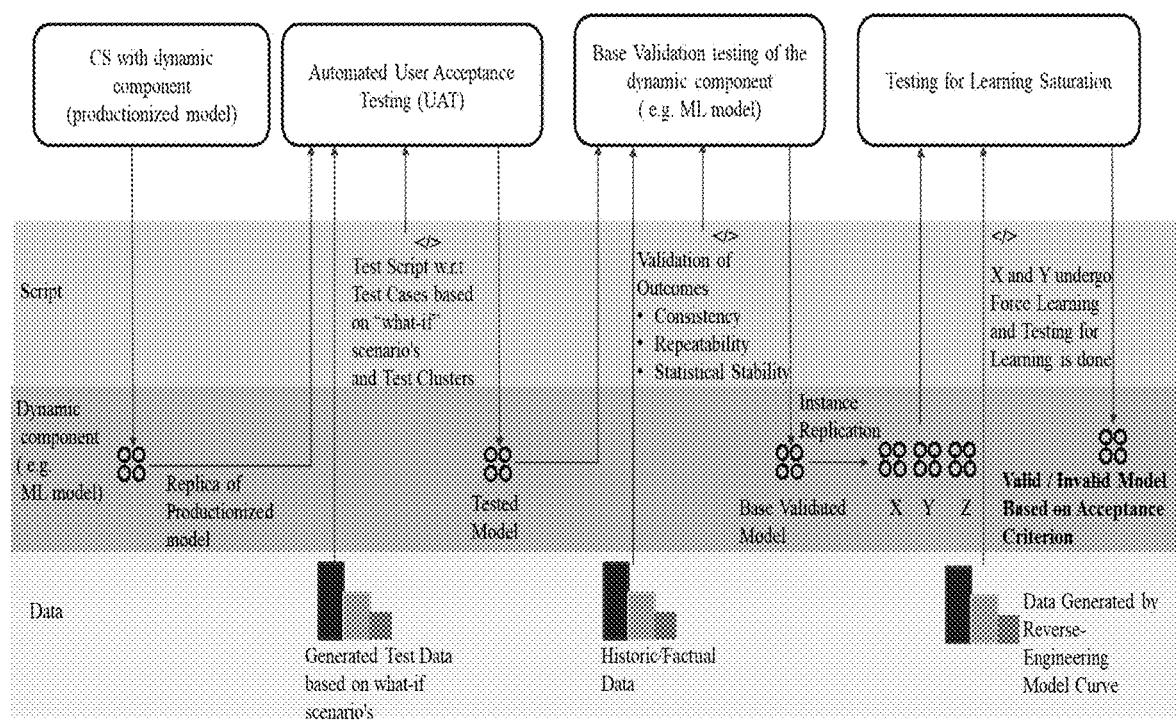
FIG. 1B illustrates architectural and process overview of the system of FIG. 1A for automated continuous validation for regulatory compliance of the CS comprising the dynamic component, in accordance with some embodiments of the present disclosure.

FIG. 1B illustrates example architectural and process overview of the system 100 of FIG. 1A for automated continuous validation for regulatory compliance of the CS comprising the dynamic component, in accordance with some embodiments of the present disclosure. As depicted, in example herein the CS is an Artificial Intelligence (AI) system with Machine Learning (ML) model that introduces dynamicity to the AI system with its continuous learning or regular ontology update, when in production stage. Throughout the description the system and method are explained with AI system as an example. However, it is to be understood that the system 100 disclosed here is applicable for validation testing of any system with one or more dynamic components, such as in quantum computing systems. The system continuously checks system logs to detect any learning of the ML model (dynamic component). On identification of learning of the CS, the system 100 generates a replica of the ML model and initiates process to perform User Acceptance Testing (UAT). The UAT is performed by generating automated test cases of varying types in accordance with what-if scenarios. The test cases are executed using generated a synthetic test data generated using a unique approach. Once the UAT is performed, the CS with the dynamic component undergoes base validation testing on clean data (positive scenarios of outcome of the CS) and dirty data (negative scenarios) by conducting repeatability, stability (consistency) and reliability checks. Unlike the existing method above, the performance parameter for which the CS is tested is not restricted to only accuracy but considers other parameters such as confusion matrix and the like. The base validation testing is then followed by learning saturation testing that performs learning saturation testing by creating multiple replicas of the base validation tested ML model, wherein if the ML model (dynamic component) is validated, the CS version is rolled out in production environment else the ML model is rolled back to the earlier version. Unlike existing method mentioned above, which does not refer to test data being be assessed through the production model to test the outcome or input output relationships or the characteristics of inputs as per a preset acceptance criteria, the method disclosed perform testing on dynamic component in production stage. The architecture of FIG. 1B is better understood in conjunction with flow diagrams of FIG. 2 and FIG. 3.

Figure 2A:
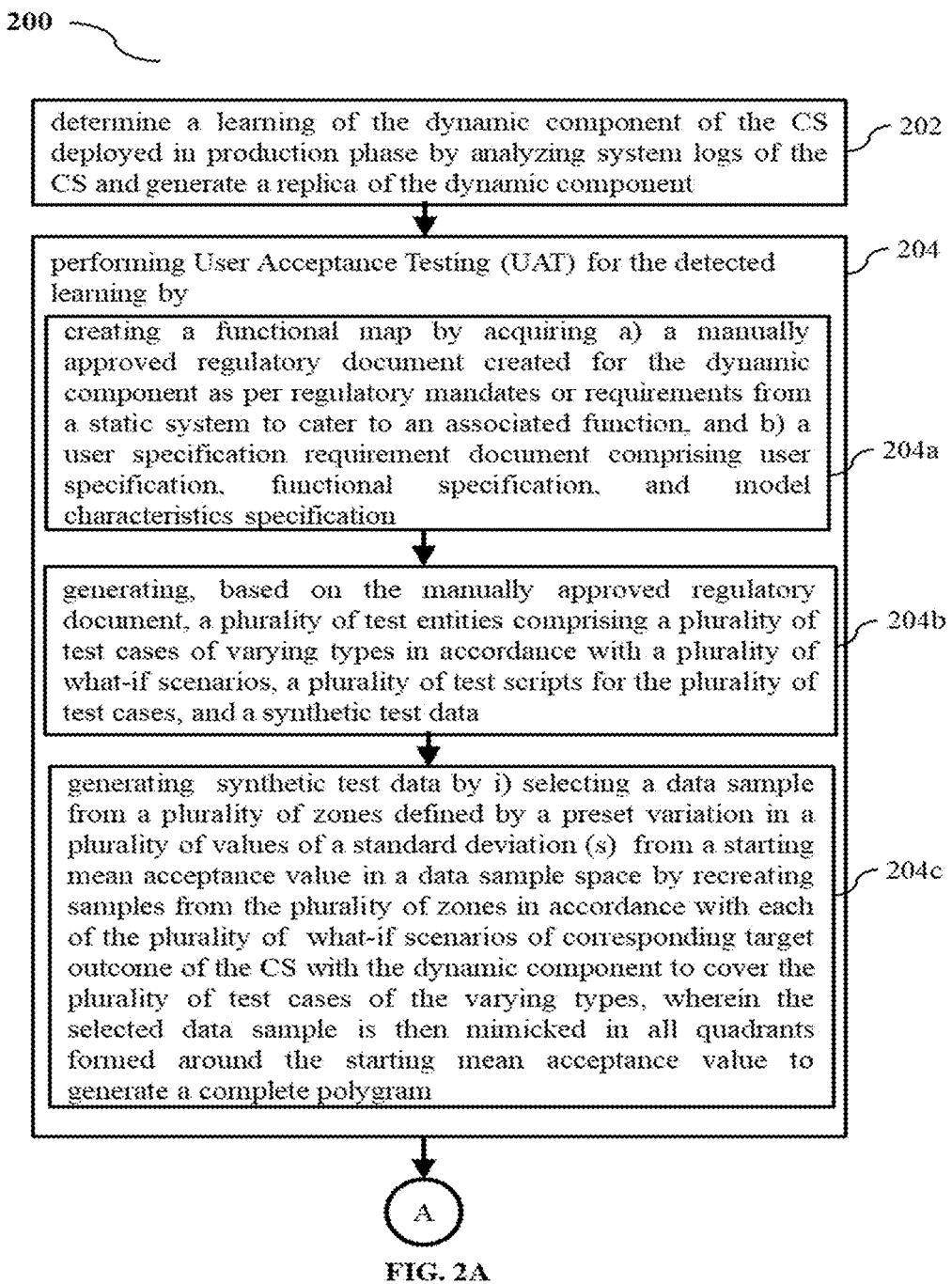
FIGS. 2A, 2B and 2C (collectively referred as FIG. 2) depict a flow diagram of a method for automated continuous validation for regulatory compliance of the CS comprising the dynamic component, using the system of FIG. 1, in accordance with some embodiments of the present disclosure.
Figure 2B:
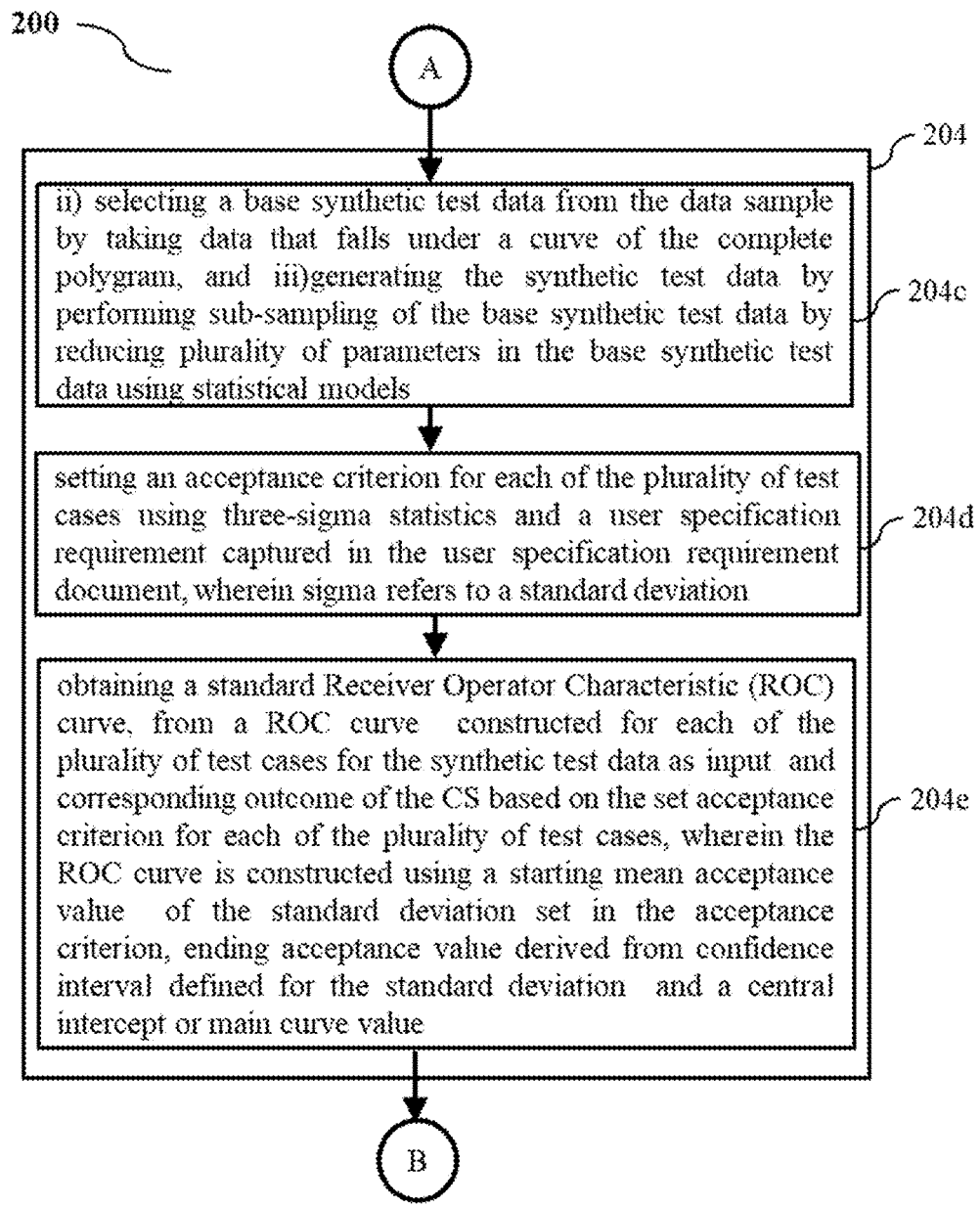
Figure 2C:
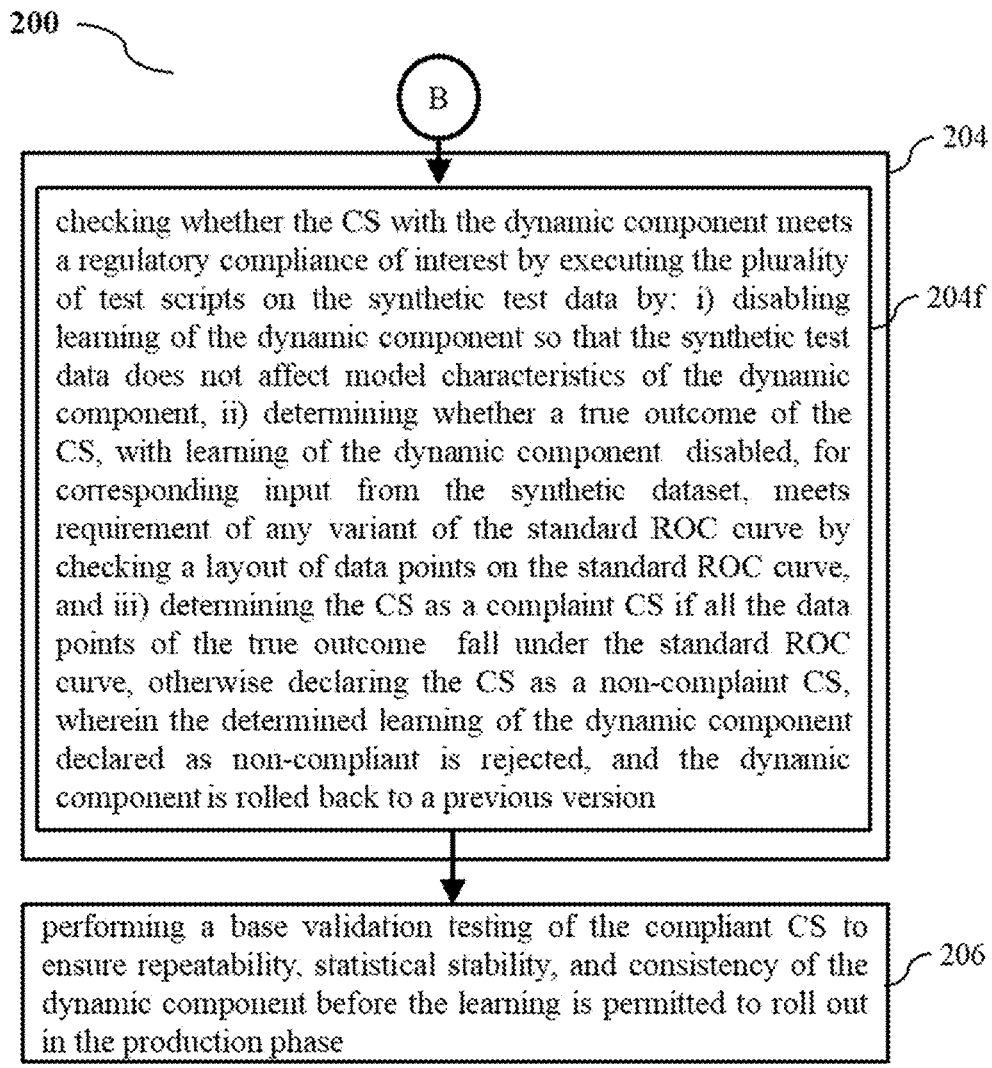
Figure 3:
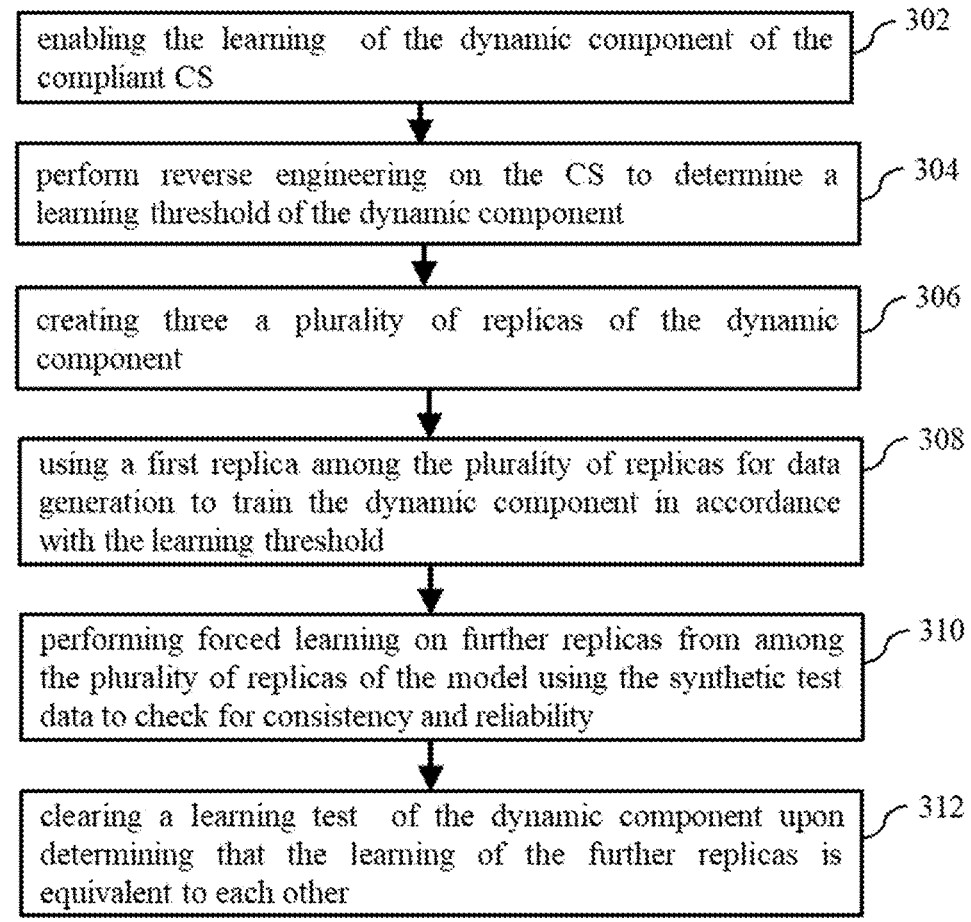
FIG. 3 is flow diagram depicting a process of the method of FIG. 2 for performing learning saturation testing of the dynamic component, in accordance with some embodiments of the present disclosure.

FIGS. 2A, 2B and 2C (collectively referred as FIG. 2) depict a flow diagram of a method 200 for automated continuous validation for regulatory compliance of the CS comprising the dynamic component, using the system of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIGS. 1A and 1B and the steps of flow diagram as depicted in FIG. 2 and FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Figure 4:
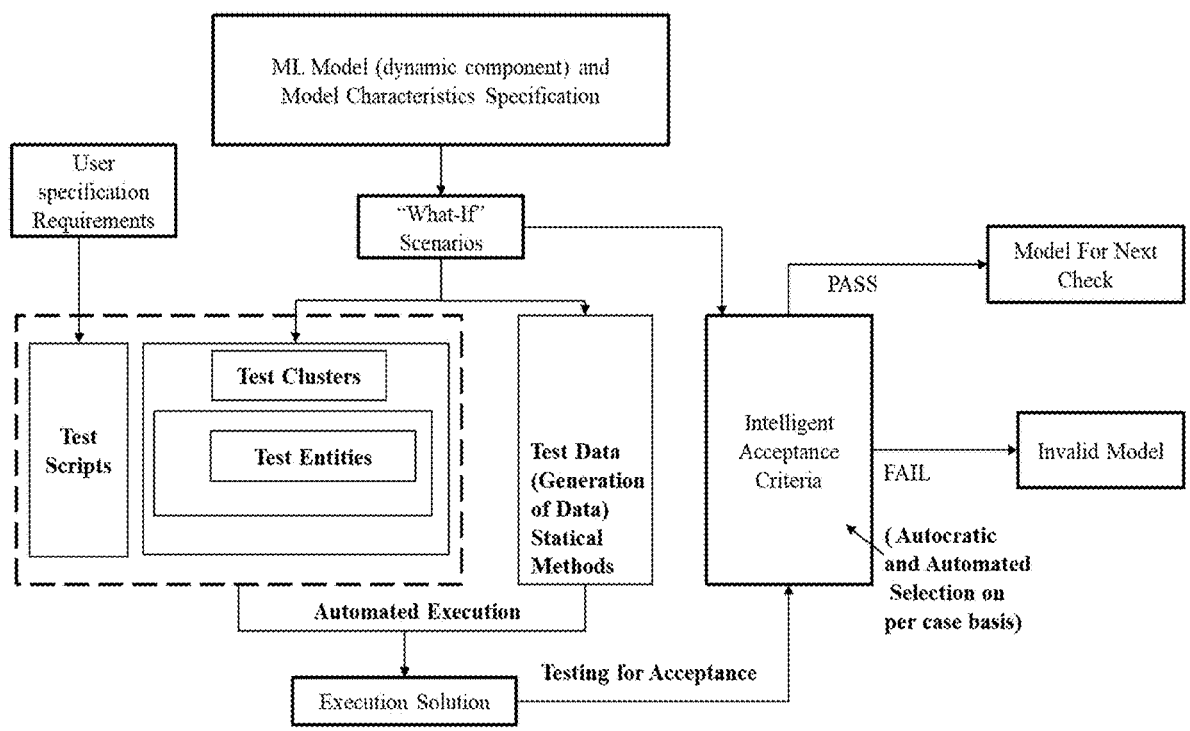
FIG. 4 is a functional block of the system of FIG. 1 depicting automated generation of test cases and setting up of acceptance criteria for User Acceptance Testing (UAT) for learning acquired by the dynamic component, in accordance with some embodiments of the present disclosure.
Figure 5:
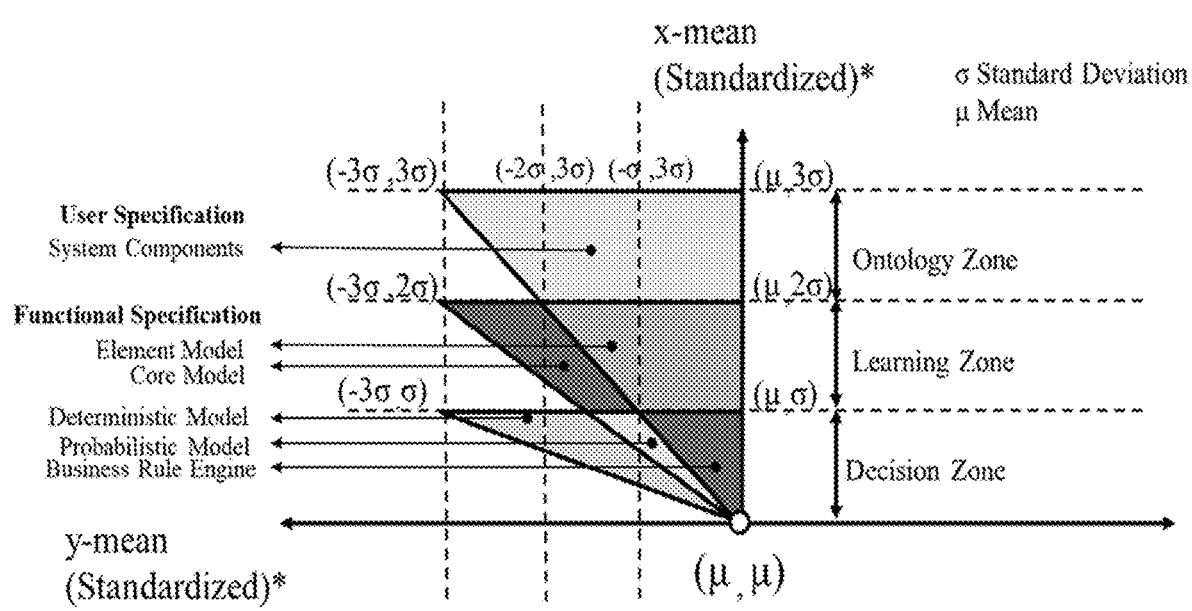
FIGS. 5 and 6 depict process of selecting a base synthetic test data from a data sample space, in accordance with some embodiments of the present disclosure.

Referring to the steps of the method 200, at step 202 of the method 200, the one or more hardware processors 104 detect a learning of the dynamic component by analyzing system logs of the CS and generating a replica of the dynamic component of the CS deployed in production phase if learning is detected. At step 204 of the method 200, the one or more hardware processors 104 perform the User Acceptance Testing (UAT) in real time on the replica of the dynamic component for the detected learning. The UAT is explained in conjunction with FIG. 4 that depicts UAT process for the example AI system (CS) with acquired learning of the ML model (dynamic component) and steps 204a through 204f as below:

a) Creating a functional map by acquiring i) a manually approved regulatory document created for the dynamic component as per regulatory mandates or requirements from a static system to cater to an associated function, and ii) a user specification requirement document comprising user specification, functional specification, and model characteristics specification (204a). An example functional map creation is provided below:

b) User Specification Requirements received can be for example, E2B Requirements. Based on the E2B requirements, the Data Schema is created (i.e. edit checks and Meta Data). The functional specification mapping of static system component to dynamic component is done next (i.e. the translation of the human code to machine function). Further the creation/training/configuration of the dynamic component is done, and the functional map is created followed by the mapping of Data Schema to function map. Generating, based on the manually approved regulatory document, a plurality of test entities comprising a plurality of test cases of varying types in accordance with a plurality of what-if scenarios, a plurality of test scripts for the plurality of test cases, and synthetic test data (204b). The plurality of test cases are generated automatically in accordance known methods in the art. However, the method 200 selects the test cases mapping to the what-if scenarios, enabling creating bad data to generate bad scenarios along with good or ideal scenarios of input data. For example, there can be a field "Gender" which is designed for the CS (ML model) to take inputs "male", "Female" and "Other". In this case, there are many scenarios. Three Scenarios are good case scenarios which are those three exact values. Bad case Scenarios can be variants of these words like "MALE", Male, M, some Spelling mistakes like Mal, Mle, Mel, some conventional variations like man, Man, some translations like Homme. In some cases, people may write non-binary, Transgender etc. so all these are the what-if scenarios, some of which are acceptable, some are not. Like the above what-if scenarios of input, there can be scenarios of outcome. For example, Male is coded as 1 and female is coded as 2. This is a good case scenario. What if someone writes Fe male and it gets coded as Fe 1. Thus, test cases are generated in accordance with the what-if scenarios identified for the specific use case application of the CS. As depicted in FIG. 4, the automated creation of test cases, test scripts and generation of test data is based on a) test units and cluster creation and b) sources. The test units and cluster creation generates range specific data tests, dependent data tests (data based on nested outcomes), boundary data tests and test data beyond the boundary. The sources include user specification, functional specification, and model characteristics specification.

c) Further, to execute the test cases on the replica of the dynamic component, the synthetic test data for the plurality of test cases is generated using statistical techniques (204c). The data sample is selected from a plurality of zones selecting a data sample from a plurality of zones defined by a pre-set variation in a plurality of values of a standard deviation (s) from a starting mean acceptance value ($\mu_x$, $\mu_y$) in a data sample space. The test cases are generated by recreating samples from the plurality of zones in accordance with each of the plurality of what-if scenarios of corresponding target outcome of the CS with the dynamic component to cover the plurality of test cases of the varying types. The selected data sample is then mimicked or recreated in all quadrants (x, y), (-x, y), (x, -y) and (-x, -y) formed around the starting mean acceptance value ($\mu_x$, $\mu_y$) to generate a complete polygram. The standard deviation and the starting mean acceptance values are received in the user specification requirements. FIG. 5 depicts an example data sample space with plurality of zones, for example, an ontology zone, a learning zone and a decision zone, for an example AI system. The data sampling or selection is from within polygons formed by intersection of the plurality of zones defined by statistical spread around the selected x-mean and y-mean (defining the centre or centroid) as depicted in the graphical data sample space representation of FIG. 5. Three pre-set values of standard deviation (s, 2s, 3s) around the centre or centroid {x-mean and y-mean ($\mu$, $\mu$)} are considered that generate intersecting triangles in quadrant defined by negative y-mean and positive x-mean values, as depicted in FIG. 5. The data sample is selected from one or more intersecting regions based on the functional map generated from the user specification, the functional specification, and the model characteristics specification. The model characteristics include various models. For the example AI system herein, the models refer to the deterministic model, probabilistic model, business rule engine, core model, element model, system components and the like.

i) Action/Output Oriented data
   1. Decision zone
   2. Learning zone
   3. Ontology zone ii) Solution Components
   1. Business Rule Engine delivered outcomes
   2. System Components (Fixed algorithms) Delivered outcomes
   3. Core Model (Ontology and defined transformation) delivered outcomes
   4. Element (Determination based) model
   5. Deterministic Model Delivered outcomes
   6. Probabilistic Model The above example is specific to AI systems. However, when handling dynamicity of quantum computing systems, such as Variation Quantum Eigensolver (VQE), the plurality of zones can be Vibrational Matrix, Quantum Spins, and equations, and eigenvalues in the Eigensolver set.

Figure 6:
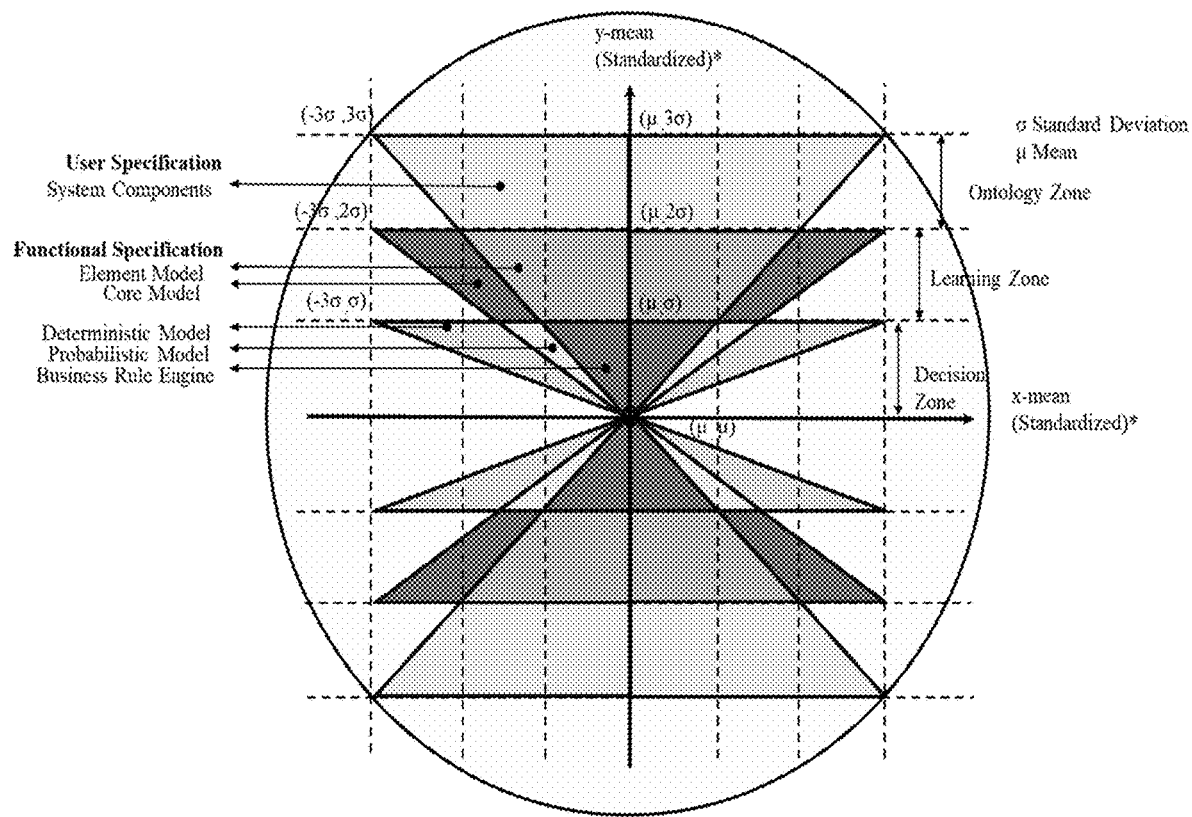
Figure 7:
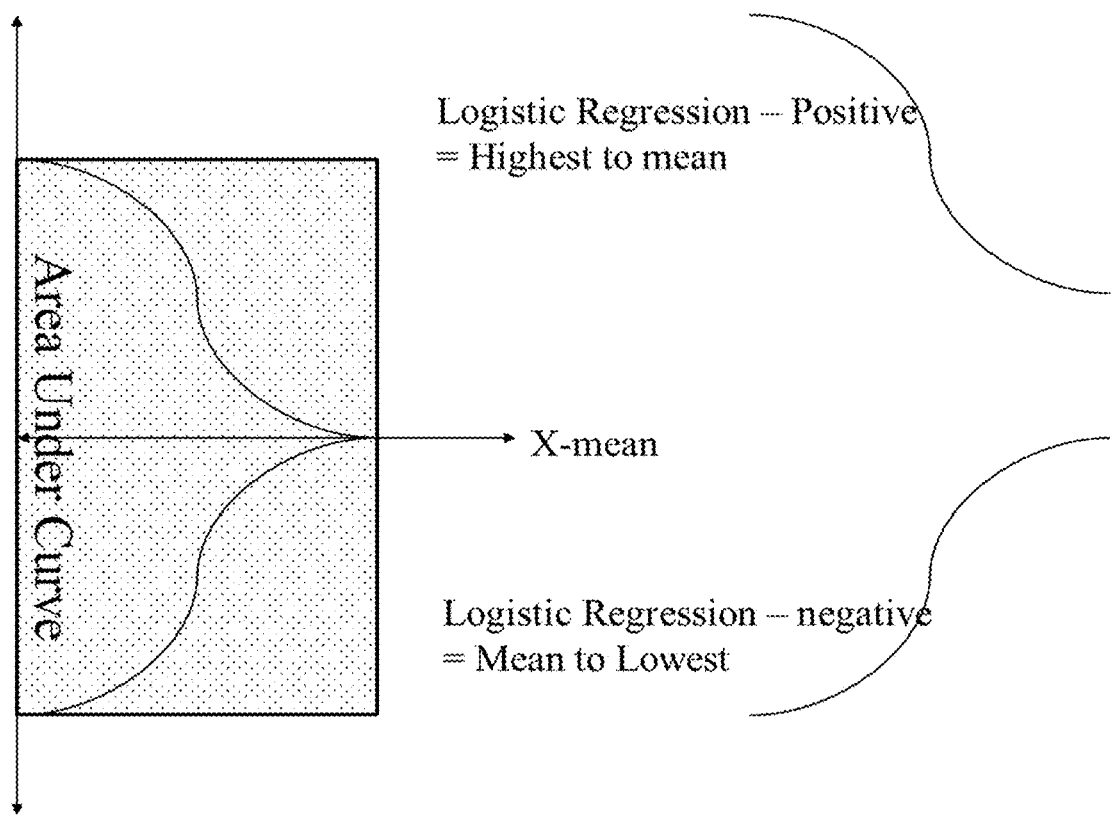
FIG. 7 depicts technique for sub-sampling of the base synthetic test data using logistic regression to generate a synthetic test data to be utilized for executing the generated test cases, in accordance with some embodiments of the present disclosure.

However, the data sample identified in one quadrant as depicted in FIG. 5 provides data associated with all good scenarios or ideal scenarios. Thus, to capture data of all types (good and bad scenarios), a complete polygram spreading across all four quadrants around ($\mu_x$, $\mu_y$) with boundaries defined by s, 2s, 3s is identified. Thus, the selected data sample, referred as a base synthetic test data, comprises data falling under the curve of the complete polygram, as depicted in FIG. 6. The base synthetic test data is huge and hence the synthetic test data is generated by performing sub-sampling of the base synthetic test data by reducing plurality of parameters in the base synthetic test data using statistical models. As depicted in FIG. 7, the data sub-sampling is performed using logistic regression. All the cases for data selection are automatically selected by two mirroring logistic regressions for each test element, picking up the cases, which fall in area under curve to have good set of all true positive, true negatives, false positive and false negative scenarios. If required, multiple layers of aggregation are performed depending upon span of cases.

Figure 8:
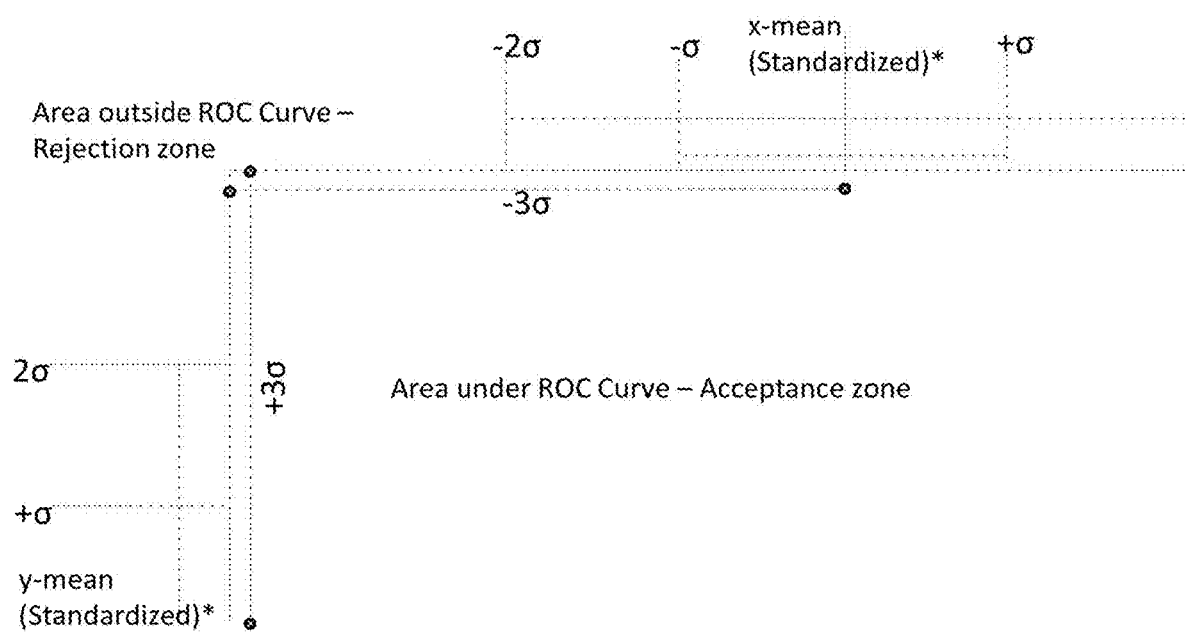
FIG. 8 depicts a standardized Receiver Operator Characteristic (ROC) that is used to determine whether the CS with new learning of the dynamic component is compliant to the to a regulatory compliance of interest, in accordance with some embodiments of the present disclosure.
Figure 9:
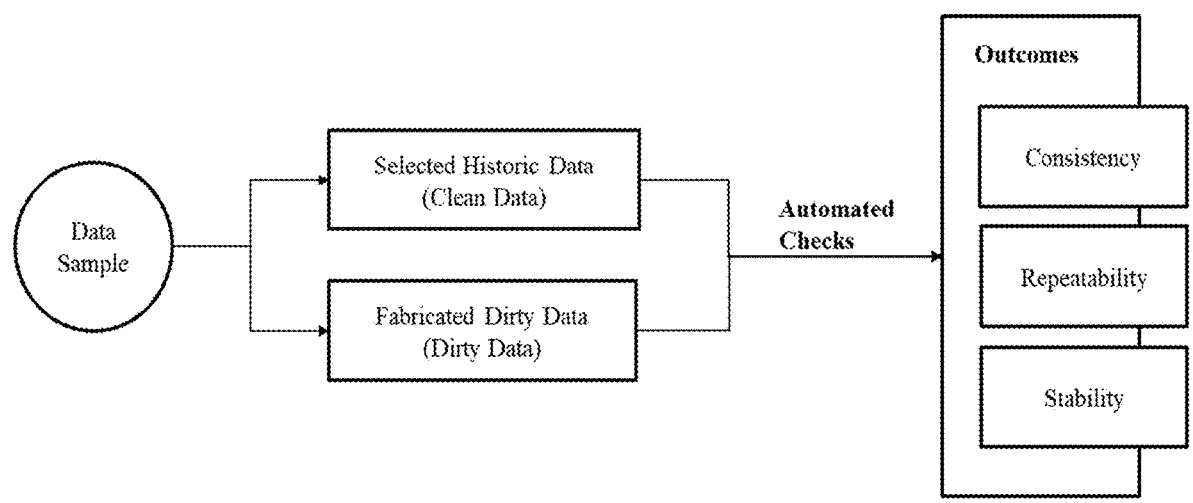
FIG. 9 depicts automated base validation testing of the dynamic component of the compliant CS to ensure repeatability, statistical stability, and consistency of the dynamic component before the learning is permitted to roll out in a production phase, in accordance with some embodiments of the present disclosure.

Permutation and combination of various scenarios based on nested outcomes is performed. All possibilities that are covered in various zones and to include all data [$\mu\pm3s$] in all quadrants as depicted in FIG. 6. E.g. for a system built to predict patient outcomes based on pathological or diagnostics reports, test cases must be built around risk profiling data of patient for the concerned disease, patient demography, patient treatment, and other similar test cases.

d) Setting an acceptance criterion for each of the plurality of test cases using three-sigma statistics defined by the standard deviation values (s, 2s, 3s) and a user specification requirement captured in the user specification requirement document (204d).

e) Obtaining a standard Receiver Operator Characteristic (ROC) curve, from a ROC curve constructed for each of the plurality of test cases for the synthetic test data as input and corresponding outcome of the CS based on the set acceptance criterion for each of the plurality of test cases (204e). As depicted in FIG. 8, the expectation is that the synthetic data of good cases must remain under area of the ROC curve and bad cases must be outside ROC curve. The ROC curve is constructed using the starting mean acceptance value, ending acceptance value derived from confidence interval defined for the standard deviation and a central intercept or main curve value. This starting value is the mean acceptance value. For example, if accuracy acceptance is 85%, the starting value is 85. From here, a confidence interval of standard deviation values can be used to create the quadrant spread like if it is 85+/−5%=80-90. The range of this can be (90, 90), (90, 85), (85, 80), (80, 80), now these values are the extreme values, which intersect at 85. However, this is rather a simple example for mere explanation. In a data set, there will be 100s of such values and their coordinate geometry will be invoked for this ROC construction.

f) Once the standardized ROC curve is constructed, a check is performed to see whether the CS with the dynamic component updated with the new learning, meets a regulatory compliance of interest (204f). This is done by executing the plurality of test scripts on the synthetic test data by:
   1) Disabling learning of the dynamic component so that the synthetic test data does not affect model characteristics of the dynamic component.
   2) Determining whether a true outcome of the CS, with learning of the dynamic component disabled, for corresponding input from the synthetic dataset, meets requirement of any variant of the standard ROC curve by checking a layout of data points on the standard ROC curve.
   3) Determining the CS as a complaint CS if all the data points of the true outcome fall under the standard ROC curve, otherwise declaring the CS as a non-complaint CS, wherein the determined learning of the dynamic component declared as non-compliant is rejected, and the dynamic component is rolled back to a previous version (refer FIG. 8).

4) Table 1 below provides coordinates of Y-Mean, Y-Confidence Interval, X Mean, X-Confidence Interval calculated for acceptance criteria of 85% of an example system. The coordinates of the centroid, horizontal base and vertical Base of the ROC Curve of the example system are depicted in FIG. 8.

TABLE 1

| Y-Mean | Y-CI | X-Mean | X-CI | | ROC Coordinate |
|---|---|---|---|---|---|
| 0.398942 | 0.084717 | 0.802337 | 0.0251 | Centroid | (0.25415178606692, −0.0752987843807916) |
| | 0.169435 | | 0.050199 | Horizontal base | (0.802337456877308, −0.0250995947935972) |
| | 0.254152 | | 0.075299 | Vertical base | (0.0752987843807916, −0.398942280401433) |

Further, at step 206 of the method 200, the one or more hardware processors 104 perform the base validation testing of the compliant CS to ensure repeatability, statistical stability, and consistency of the dynamic component before the learning is permitted to roll out in the production phase. The base validation testing can be understood conjunction with FIG. 9 and the steps 206a through 206d. The data for the base validation testing comprises clean data selected from the historic data and fabricated dirty data and is used to carry out the testing of the dynamic component by:
a) Disabling the learning of the dynamic component of the compliant CS.
b) Analysing the true outcome of the compliant CS for repeatability by checking whether same prediction is received at outcome of the compliant CS when single or compliant row of data, among the synthetic test data, for prediction is passed through the dynamic component. Further, checking whether same prediction is received at outcome of the compliant CS as original prediction when the data with some variation is provided as input to the dynamic component a predefined number of times (n times, wherein n is defined by an subject matter expert), wherein predefined number of times can be defined by an expert.
c) Analysing the true outcome of the compliant CS for consistency by providing different variations of the data multiple times as input to the dynamic component to check the consistency of outcomes by checking whether same outcome is received for same type of the test entities.
d) Further, analysing the true outcome of the compliant CS for statistical stability by using a combination of repeatability and consistency validation process.

FIG. 3 is flow diagram depicting a process 300 of the method of FIG. 2 for performing learning saturation testing of the dynamic component, in accordance with some embodiments of the present disclosure. Performing learning saturation testing of the compliant CS is explained in conjunction with FIG. 10 and steps 302 through 312 comprises:
a) Enabling the learning of the dynamic component of the compliant CS (302).
b) Performing reverse engineering on the CS to determine a learning threshold of the dynamic component (304);

c) Creating a plurality of replicas of the dynamic component (306). As depicted in example of FIG. 10 four replicas are created.
d) Using a first replica among the plurality of replicas for data generation to train the dynamic component in accordance with the learning threshold (308). This is the automated forced learning.
e) Performing forced learning on further replicas from among the plurality of replicas of the model using the synthetic test data to check for consistency and reliability (310). Thus, this step ensures that when subjected to manual forced learning, does the respective replica shows right learning.
f) Clearing a learning test of the dynamic component upon determining that the learning of the further replicas is equivalent to each other.

Figure 10:
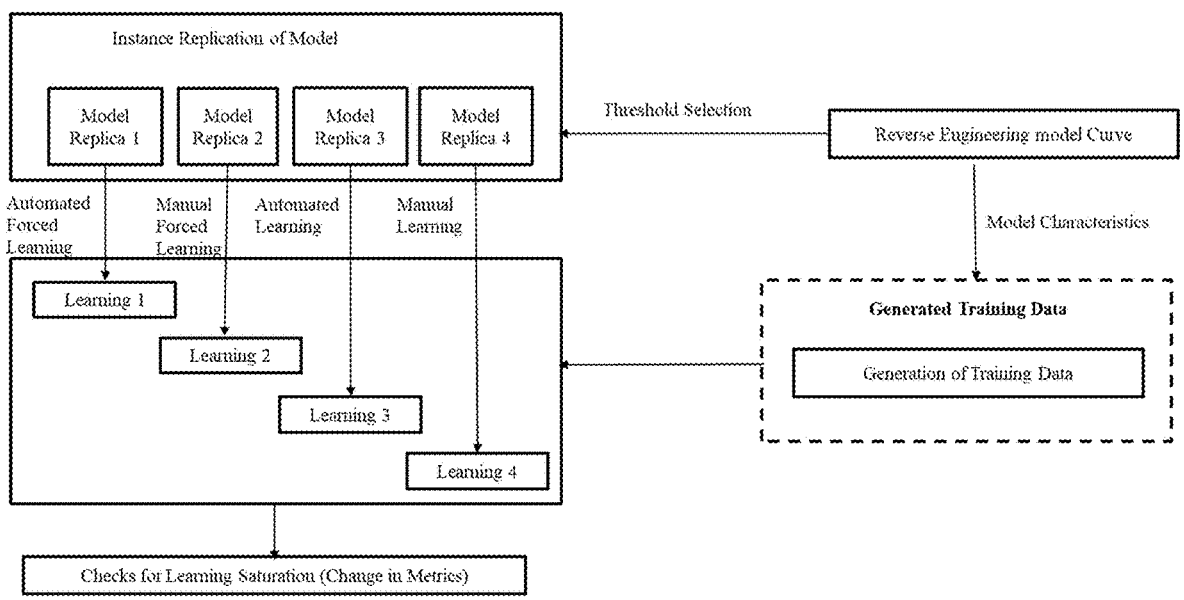
FIG. 10 depicts automated identification of learning saturation of the dynamic component that is validated during the base validation testing, in accordance with some embodiments of the present disclosure.

As depicted in FIG. 10, a model restore point is created by various methods (e.g. replication, wherein X, Y, Z are 3 Replicas of the same model (dynamic component). Further, training set for the models is created based on Reverse Engineering of the original model curve (one of the replicas). Model Replica X undergoes forced learning to check if system can learn. Same is repeated for Model Replica Y to check if same learning is obtained. Model is checked for any learning gap, if noticed, or any deviation from the learning is noticed. If model deviates from the intended learning behavior it is discarded for next step. Thus, it is ensured that learning of all the replicas is equivalent before providing a go ahead for the learning of the model and accepting in in production environment.

Thus, the method and system disclosed herein provides a solution to unsolved technical problem of automated validation testing of the CS with dynamic components, while in production environment. The method provides continuous validation testing of CS comprising the dynamic component by automatically repeating the validation testing each time when change is identified, without pulling out the CS from production phase.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for automated continuous validation for regulatory compliance of a Computer System (CS) comprising a dynamic component, the method comprising:
   detecting, via one or more hardware processors, a learning of the dynamic component by analyzing system logs of the CS and generating a replica of the dynamic component of the CS deployed in production phase if the learning is detected;
   performing, via the one or more hardware processors, a User Acceptance Testing (UAT) in real time on the replica of the dynamic component for the detected learning by:
   a) creating a functional map by acquiring i) a manually approved regulatory document created for the dynamic component as per regulatory mandates or requirements from a static system to cater to an associated function, and ii) a user specification requirement document comprising user specification, functional specification, and model characteristics specification;
   b) generating, based on the manually approved regulatory document, a plurality of test entities comprising a plurality of test cases of varying types in accordance with a plurality of what-if scenarios, a plurality of test scripts for the plurality of test cases, and a synthetic test data;
   c) generating the synthetic test data for the plurality of test cases by:
      selecting a data sample from a plurality of zones defined by a pre-set variation in a plurality of values of a standard deviation (s) from a starting mean acceptance value ($\mu_x$, $\mu_y$) in a data sample space by recreating samples from the plurality of zones in accordance with each of the plurality of what-if scenarios of corresponding target outcome of the CS with the dynamic component to cover the plurality of test cases of the varying types, wherein the selected data sample is then mimicked in all quadrants formed around the starting mean acceptance value ($\mu_x$, $\mu_y$) to generate a complete polygram;
      selecting a base synthetic test data from the data sample by taking data that falls under curve of the complete polygram; and
      generating the synthetic test data by performing sub-sampling of the base synthetic test data by reducing plurality of parameters in the base synthetic test data using statistical models;
   d) setting an acceptance criterion for each of the plurality of test cases using three-sigma statistics defined by the standard deviation values (s, 2s, 3s) and a user specification requirement captured in the user specification requirement document;
   e) obtaining a standard Receiver Operator Characteristic (ROC) curve, from a ROC curve constructed for each of the plurality of test cases for the synthetic test data as input and corresponding outcome of the CS based on the set acceptance criterion for each of the plurality of test cases, wherein the ROC curve is constructed using the starting mean acceptance value, ending acceptance value derived from confidence interval defined for the standard deviation and a central intercept value; and f) checking whether the CS with the dynamic component meets a regulatory compliance of interest by executing the plurality of test scripts on the synthetic test data by:

disabling the learning of the dynamic component so that the synthetic test data does not affect model characteristics of the dynamic component;

determining whether a true outcome of the CS, with the learning of the dynamic component disabled, for corresponding input from a synthetic dataset, meets requirement of any variant of the standard ROC curve by checking a layout of data points on the standard ROC curve; and determining the CS as a complaint CS if all the data points of the true outcome fall under the standard ROC curve, otherwise declaring the CS as a non-complaint CS, wherein the determined learning of the dynamic component declared as non-compliant is rejected, and the dynamic component is rolled back to a previous version; and performing, via the one or more hardware processors, a base validation testing of the compliant CS to ensure repeatability, statistical stability, and consistency of the replica of the dynamic component before the learning is permitted to roll out in the production phase.

2. The method of claim 1, wherein performing the base validation testing of the compliant CS comprises:

disabling the learning of the dynamic component of the compliant CS;

analyzing the true outcome of the compliant CS for the repeatability by:

checking whether same prediction is received at outcome of the compliant CS when single or compliant row of data, among the synthetic test data, for the prediction is passed through the dynamic component; and checking whether same prediction is received at outcome of the compliant CS as original prediction when clean data and dirty data with variation is provided as input to the dynamic component a pre-defined number of times;

analyzing the true outcome of the compliant CS for consistency by:

providing different variations of the clean data and the dirty data multiple times as input to the dynamic component to check the consistency of outcomes by checking whether same outcome is received for same type of the test entities; and analyzing the true outcome of the compliant CS for the statistical stability by using a combination of the repeatability and the consistency base validation testing process.

3. The method of claim 1, further comprising performing learning saturation testing of the compliant CS by:

enabling the learning of the dynamic component of the compliant CS;

performing reverse engineering on the CS to determine a learning threshold of the dynamic component;

creating a plurality of replicas of the dynamic component;

using a first replica among the plurality of replicas for data generation to train the dynamic component in accordance with the learning threshold;

performing forced learning on further replicas from among the plurality of replicas of the dynamic component using the synthetic test data to check for the consistency and reliability; and clearing a learning test of the dynamic component upon determining that the learning of the further replicas is equivalent to each other.

4. The method of claim 1, further comprising providing continuous validation testing of the CS comprising the dynamic component by automatically repeating the base validation testing each time when a change is identified, without pulling out the CS from the production phase.

5. A system for automated continuous validation for regulatory compliance of a Computer System (CS) comprising a dynamic component, the system comprising:

a memory storing instructions;

one or more Input/Output (I/O) interfaces; and one or more hardware processors coupled to the memory via the one or more I/O interfaces, wherein the one or more hardware processors are configured by the instructions to:

detect a learning of the dynamic component by analyzing system logs of the CS and generating a replica of the dynamic component of the CS deployed in production phase if the learning is detected;

perform a User Acceptance Testing (UAT) in real time on the replica of the dynamic component for the detected learning by:

a) creating a functional map by acquiring i) a manually approved regulatory document created for the dynamic component as per regulatory mandates or requirements from a static system to cater to an associated function, and ii) a user specification requirement document comprising user specification, functional specification, and model characteristics specification;

b) generating, based on the manually approved regulatory document, a plurality of test entities comprising a plurality of test cases of varying types in accordance with a plurality of what-if scenarios, a plurality of test scripts for the plurality of test cases, and a synthetic test data;

c) generating the synthetic test data for the plurality of test cases by:

selecting a data sample from a plurality of zones defined by a pre-set variation in a plurality of values of a standard deviation (s) from a starting mean acceptance value ($\mu_x$, $\mu_y$) in a data sample space by recreating samples from the plurality of zones in accordance with each of the plurality of what-if scenarios of corresponding target outcome of the CS with the dynamic component to cover the plurality of test cases of the varying types, wherein the selected data sample is then mimicked in all quadrants formed around the starting mean acceptance value ($\mu_x$, $\mu_y$) to generate a complete polygram;

selecting a base synthetic test data from the data sample by taking data that falls under curve of the complete polygram; and generating the synthetic test data by performing sub-sampling of the base synthetic test data by reducing plurality of parameters in the base synthetic test data using statistical models;

d) setting an acceptance criterion for each of the plurality of test cases using three-sigma statistics defined by the standard deviation values (s, 2s, 3s) and a user specification requirement captured in the user specification requirement document;

e) obtaining a standard Receiver Operator Characteristic (ROC) curve, from a ROC curve constructed for each of the plurality of test cases for the synthetic test data as input and corresponding outcome of the CS based on the set acceptance criterion for each of the plurality of test cases, wherein the ROC curve is constructed using the starting mean acceptance value, ending acceptance value derived from confidence interval defined for the standard deviation and a central intercept value; and f) checking whether the CS with the dynamic component meets a regulatory compliance of interest by executing the plurality of test scripts on the synthetic test data by:
   disabling the earning of the dynamic component so that the synthetic test data does not affect model characteristics of the dynamic component;
   determining whether a true outcome of the CS, with the learning of the dynamic component disabled, for corresponding input from a synthetic dataset, meets requirement of any variant of the standard ROC curve by checking a layout of data points on the standard ROC curve; and
   determining the CS as a complaint CS if all the data points of the true outcome fall under the standard ROC curve, otherwise declaring the CS as a non-complaint CS, wherein the determined learning of the dynamic component declared as non-compliant is rejected, and the dynamic component is rolled back to a previous version; and perform a base validation testing of the compliant CS to ensure repeatability, statistical stability, and consistency of the replica of the dynamic component before the learning is permitted to roll out in the production phase.

6. The system of claim 5, wherein the one or more hardware processors are configured to perform the base validation testing of the compliant CS by:
   disabling the learning of the dynamic component of the compliant CS;
   analyzing the true outcome of the compliant CS for the repeatability by:
      checking whether same prediction is received at outcome of the compliant CS when single or compliant row of data, among the synthetic test data, for the prediction is passed through the dynamic component; and
      checking whether same prediction is received at outcome of the compliant CS as original prediction when clean data and dirty data with variation is provided as input to the dynamic component a pre-defined number of times;
   analyzing the true outcome of the compliant CS for the consistency by:
      providing different variations of the clean data and the dirty data multiple times as input to the dynamic component to check the consistency of outcomes by checking whether same outcome is received for same type of the test entities; and
   analyzing the true outcome of the compliant CS for the statistical stability by using a combination of the repeatability and the consistency base validation testing process.

7. The system of claim 5, wherein the one or more hardware processors are further configured to perform learning saturation testing of the compliant CS by:
   enabling the learning of the dynamic component of the compliant CS;
   performing reverse engineering on the CS to determine a learning threshold of the dynamic component;
   creating a plurality of replicas of the dynamic component;
   using a first replica among the plurality of replicas for data generation to train the dynamic component in accordance with the learning threshold;
   performing forced learning on further replicas from among the plurality of replicas of the dynamic component using the synthetic test data to check for the consistency and reliability; and
   clearing a learning test of the dynamic component upon determining that the learning of the further replicas is equivalent to each other.

8. The system of claim 5, wherein the one or more hardware processors are configured to provide continuous validation testing of the CS comprising the dynamic component by automatically repeating the base validation testing each time when a change is identified, without pulling out the CS from the production phase.

9. One or more non-transitory machine-readable information storage mediums comprising one or more instructions which when executed by one or more hardware processors cause:
   detecting learning of the dynamic component by analyzing system logs of the CS and generating a replica of the dynamic component of the CS deployed in production phase if the learning is detected;
   performing a User Acceptance Testing (UAT) in real time on the replica of the dynamic component for the detected learning by:
      a) creating a functional map by acquiring i) a manually approved regulatory document created for the dynamic component as per regulatory mandates or requirements from a static system to cater to an associated function, and ii) a user specification requirement document comprising user specification, functional specification, and model characteristics specification;
      b) generating, based on the manually approved regulatory document, a plurality of test entities comprising a plurality of test cases of varying types in accordance with a plurality of what-if scenarios, a plurality of test scripts for the plurality of test cases, and a synthetic test data;
      c) generating the synthetic test data for the plurality of test cases by:
         selecting a data sample from a plurality of zones defined by a pre-set variation in a plurality of values of a standard deviation (s) from a starting mean acceptance value ($\mu_x$, $\mu_y$) in a data sample space by recreating samples from the plurality of zones in accordance with each of the plurality of what-if scenarios of corresponding target outcome of the CS with the dynamic component to cover the plurality of test cases of the varying types, wherein the selected data sample is then mimicked in all quadrants formed around the starting mean acceptance value ($\mu_x$, $\mu_y$) to generate a complete polygram;
         selecting a base synthetic test data from the data sample by taking data that falls under curve of the complete polygram; and generating the synthetic test data by performing sub-sampling of the base synthetic test data by reducing plurality of parameters in the base synthetic test data using statistical models;

d) setting an acceptance criterion for each of the plurality of test cases using three-sigma statistics defined by the standard deviation values (s, 2s, 3s) and a user specification requirement captured in the user specification requirement document;

e) obtaining a standard Receiver Operator Characteristic (ROC) curve, from a ROC curve constructed for each of the plurality of test cases for the synthetic test data as input and corresponding outcome of the CS based on the set acceptance criterion for each of the plurality of test cases, wherein the ROC curve is constructed using the starting mean acceptance value, ending acceptance value derived from confidence interval defined for the standard deviation and a central intercept value; and f) checking whether the CS with the dynamic component meets a regulatory compliance of interest by executing the plurality of test scripts on the synthetic test data by:

disabling the learning of the dynamic component so that the synthetic test data does not affect model characteristics of the dynamic component;

determining whether a true outcome of the CS, with the learning of the dynamic component disabled, for corresponding input from a synthetic dataset, meets requirement of any variant of the standard ROC curve by checking a layout of data points on the standard ROC curve; and determining the CS as a complaint CS if all the data points of the true outcome fall under the standard ROC curve, otherwise declaring the CS as a non-complaint CS, wherein the determined learning of the dynamic component declared as non-compliant is rejected, and the dynamic component is rolled back to a previous version; and performing a base validation testing of the compliant CS to ensure repeatability, statistical stability, and consistency of the replica of the dynamic component before the learning is permitted to roll out in the production phase.

10. The one or more non-transitory machine-readable information storage mediums of claim 9, wherein performing the base validation testing of the compliant CS comprises:

disabling the learning of the dynamic component of the compliant CS;

analyzing the true outcome of the compliant CS for the repeatability by:

checking whether same prediction is received at outcome of the compliant CS when single or compliant row of data, among the synthetic test data, for the prediction is passed through the dynamic component; and checking whether same prediction is received at outcome of the compliant CS as original prediction when clean data and dirty data with variation is provided as input to the dynamic component a predefined number of times;

analyzing the true outcome of the compliant CS for the consistency by:

providing different variations of the clean data and the dirty data multiple times as input to the dynamic component to check the consistency of outcomes by checking whether same outcome is received for same type of the test entities; and analyzing the true outcome of the compliant CS for the statistical stability by using a combination of the repeatability and the consistency base validation testing process.

11. The one or more non-transitory machine-readable information storage mediums of claim 9, further comprises performing learning saturation testing of the compliant CS by:

enabling the learning of the dynamic component of the compliant CS;

performing reverse engineering on the CS to determine a learning threshold of the dynamic component;

creating a plurality of replicas of the dynamic component;

using a first replica among the plurality of replicas for data generation to train the dynamic component in accordance with the learning threshold;

performing forced learning on further replicas from among the plurality of replicas of the dynamic component using the synthetic test data to check for the consistency and reliability; and clearing a learning test of the dynamic component upon determining that the learning of the further replicas is equivalent to each other.

12. The one or more non-transitory machine-readable information storage mediums of claim 9, wherein the one or more instructions which when executed by the one or more hardware processors further cause the dynamic component by automatically repeating the base validation testing each time when a change is identified, without pulling out the CS from the production phase.

* * * * *